UNITED STATES PATENT OFFICE.

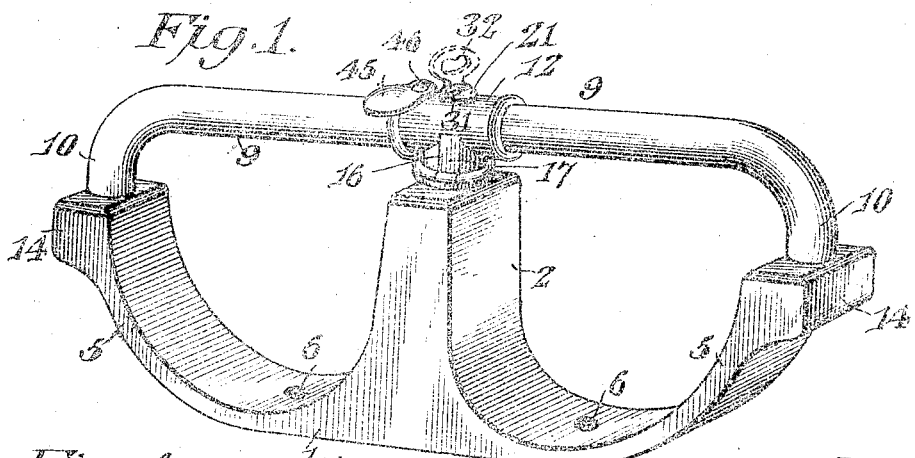

FRANKLIN C. MILLER, OF EASTON, PENNSYLVANIA.

TIRE-HOLDER FOR AUTOMOBILES, &c.

1,094,085.  Specification of Letters Patent.  Patented Apr. 21, 1914.

Application filed March 26, 1912, Serial No. 686,456. Renewed February 25, 1913. Serial No. 750,701.

*To all whom it may concern:*

Be it known that I, FRANKLIN C. MILLER, a citizen of the United States, residing at Easton, in the county of Northampton and State of Pennsylvania, have invented a new and useful Tire-Holder for Automobiles, &c., of which the following is a specification.

The invention relates to improvements in tire holders for automobiles, etc.

The object of the present invention is to improve the construction of tire holders, and to provide a simple, efficient and comparatively inexpensive tire holder of great strength and durability, designed to be mounted on the running board, or other convenient support of an automobile or other vehicle for holding spare tires, and capable of effectually preventing the same from being removed by a thief or other unauthorized person.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a tire holder, constructed in accordance with this invention. Fig. 2 is a longitudinal sectional view of the same. Fig. 3 is an enlarged vertical sectional view on the line 3—3 of Fig. 2. Fig. 4 is a longitudinal sectional view of the lock. Fig. 5 is a horizontal sectional view on the line 5—5 of Fig. 3. Fig. 6 is a detail perspective view of the tubular bolt. Fig. 7 is a plan view of the post of the base.

Like numerals of reference designate corresponding parts in all the figures of the drawing.

In the accompanying drawing in which is illustrated the preferred form of the invention, 1 designates a base or support preferably constructed of cast metal and provided with a central vertical post or connecting web 2 and having curved recesses 3, located at opposite sides of the post and forming seats adapted to receive a pair of spare tires 4, as clearly illustrated in Fig. 2 of the drawing. The recesses 3 present curved upper faces to the tires 4, and the terminal portions of the base are curved upwardly to form arms 5, which have their upper ends arranged in a plane below that of the upper end of the post. The base is provided at the bottoms of the recesses 3 with perforations 6 for the reception of screws, or other suitable fastening devices for mounting the tire holder on the running board 7, or other suitable support. The base presents a flat lower face to the running board, and the post is preferably hollowed out at the lower portion at 8 to lighten the construction.

The tires are confined in the recesses or seats of the base or support by means of a yoke 9, preferably consisting of two bars or members of tubular metal having downwardly curved outer portions 10, and provided with threaded inner ends 11, which are connected by a T-shaped coupling 12 containing locking mechanism hereinafter described, and projecting from the central portion of the coupling and fitting in a socket 13 in the upper end of the central post 2. The yoke may, however, be constructed of any other suitable material, and the terminal arms of the base are provided with enlarged upper ends 14, having sockets 15 located at the outer walls of the tire receiving recesses or seats and receiving the downwardly curved portions 10, which constitute the sides of the yoke. The sockets 15 form interior supporting shoulders against which the terminal portions 10 abut, whereby the sides of the yoke are firmly seated in and securely connected to the base.

The central portion of the T-shaped coupling depends from the center of the yoke, and it is provided with a vertical recess 16, receiving an off-set chamber 17 of a lock casing 18 of a self-contained lock, which is carried by the yoke. The casing fits at its upper end 19 in an opening 20 in the top of the coupling and receives a rotary cylinder 21, having its lower portion 22 extended beyond the lock casing and receiving a tubular bolt 23, which fits in a supporting sleeve 24, depending from the central portion of the coupling. The supporting sleeve 24 is provided at its upper end with a horizontal annular flange 25, secured by screws 26, or other suitable fastening means to the lower edge of the central depending portion of the coupling and forming a rigid reduced extension of the same to fit in the socket 13 of the central post 2. The sleeve and the coupling provide a central hollow tubular portion for engaging the post and for containing the locking means for securing the yoke to the base. The annular flange 25, which is designed to be soldered or brazed to the post in addition to being fastened to the same by the screws, presents a lower horizontal face to and fits against the upper end of the post 2 of the base.

The socket 13 is provided in its walls with an annular groove 27, having a vertical entrance branch 28 and forming an upper shoulder 29, adapted to be engaged by a horizontal arm 30, projecting from the tubular bolt 23. The tubular bolt 23 is rotatably mounted on the lower end of the vertical cylinder 21, provided with a key hole or slot 31 for the reception of a key 32 for operating coacting tumbler pins 33 and 34. The tumbler pins 33 and 34 are pressed by springs 35, housed in the off-set chamber 17 of the lock casing 18. The tumbler pins 33 and 34 and the springs 35 are of the ordinary well known construction, and the cylinder is adapted to make one complete rotation, so that the key can be inserted to operate the lock and removed after the latter is in its locked position. The tubular bolt 23, however, is intended to turn through an arc a little less than one hundred and eighty degrees to carry the projecting arm from the entrance slot to the opposite side of the supporting sleeve, and return it to the said entrance slot. The extent of the movement of the locking arm may, however, be varied, it being only sufficient to carry it away from the entrance slot to lock the yoke on the base. For this purpose, the bolt has an arcuate slot 36 into which extends a stop 37, preferably consisting of a screw secured to the cylinder. The inner end of the tubular bolt is provided with an arcuate projection 38, formed by recessing or cutting away the end of the bolt, and operating in an arcuate recess 39 of the inner or lower end of the lock casing, and adapted to engage the opposite walls or shoulders 40 of the said recess 39, so that the bolt can make only a partial rotation. The slot 36 and the stop or projection 37 constitute a lost motion connection between the rotary cylinder and the tubular bolt. When the key 32 is inserted in the lock for releasing the cylinder from the locking action of the tumbler pins, the cylinder is adapted to be rotated and during its rotation, the projection 37 is carried through the slot from one end wall thereof until it comes in contact with the other end wall of the same, and by engaging the latter end wall rotates the tubular bolt and swings the engaging or locking arm 30 and carrying the same to the vertical branch or entrance recess 28 to permit the removal of the yoke from the base. A reverse movement of the key will move the projection 37 through the slot and carry the horizontal locking arm away from the vertical entrance branch or recess 28. The horizontal locking arm 30, which is arranged at right angles to the cylinder and bolt, has a threaded inner portion 41, arranged in the threaded portion 42 extending transversely through the bolt to enable the locking arm to be applied to either side thereof, and the bolt is also preferably provided at its outer end with a longitudinal opening 43, interiorly threaded and intersecting the transverse opening 42 to enable a set screw to be employed when desired for engaging the threaded portion of the arm 30 to prevent the latter from unscrewing.

The supporting sleeve is provided at its lower portion with a transverse slot 44, through which the locking arm 30 projects. The transverse slot 44 is of sufficient length to permit the necessary oscillatory movement of the locking arm. The locking mechanism is concealed within the tire holder, and when the yoke is locked in position on the base, it extends across the bottom portions of the tires and effectually prevents the removal of the same by a thief or other unauthorized person. The yoke is equipped with a pivoted cap plate 45, secured to the coupling at the top thereof by a rivet 46, or other suitable fastening device, and adapted to be swung in a position over the key hole to protect the same and to be removed therefrom for exposing the key hole or slot. The pivoted plate is adapted to exclude dust, dirt and water from the interior of the lock to prevent the same from becoming clogged.

The claims of the present application are broad enough to cover a form of the invention shown and described in my later application, filed Jan. 31, 1913, Serial No. 745,457.

What is claimed is:—

1. A tire holder of the class described comprising a base having a vertical post and provided at opposite sides thereof with tire receiving recesses and having arms extending upward at the outer sides of the recesses, the arms being provided in their upper ends with sockets, and a yoke extending across the tire receiving recesses and having downwardly extending terminal portions fitting in the sockets of the said arms and rigidly supported by the latter, said yoke being also provided with an intermediate depending chamber, and locking means contained within the said chamber of the yoke and engaging the post for retaining the yoke on the base.

2. A tire holder of the class described including a base provided with a vertical post and having tire receiving recesses at opposite sides thereof, said base being provided at the outer sides of the recesses with upwardly extending arms having sockets in their upper ends, the upper end of the post being also provided with a socket, a yoke extending across the tire receiving recesses and composed of tubular bars having their outer terminals extending downward and fitting in the sockets of the arms of the base, a coupling connecting the inner ends of the tubular bars and having a central depending portion, a sleeve secured to the central depending portion and fitting in the socket of the post, and locking mechanism contained within the coupling and the sleeve for engaging the interior of the post.

3. A tire holder of the class described including a base provided with a vertical post and having tire receiving recesses at opposite sides thereof, said base being provided at the outer sides of the recesses with upwardly extending arms having sockets in their upper ends, the upper end of the post being also provided with a socket, a yoke extending across the recesses of the base and having terminal portions to fit in the sockets of the said arms and provided at an intermediate point with a hollow depending portion fitting within the socket of the post, and locking mechanism contained within the hollow portion of the yoke and provided with means for engaging the post within the socket thereof.

4. A tire holder of the class described comprising a base or support having spaced concave tire receiving seats with an intermediate connecting web, and a removable yoke arching the base or support and having downwardly extending terminal portions detachably engaging the outer wall of each of the said tire receiving seats, said yoke being provided with a self-contained lock located centrally of the yoke and having means for engaging the said connecting web.

5. A tire holder of the class described comprising a base or support having spaced concave tire receiving seats with an intervening connecting web, and provided at the outer walls of said seats with sockets, and a yoke arching the base or support and having downwardly extending terminal portions engaging said sockets, and a self-contained lock located centrally of the yoke and depending from the same between the said seats, said lock being adapted to engage with the said connecting web.

6. A tire holder of the class described comprising a base or support having spaced concave tire receiving seats with an intervening connecting web, and a yoke arching the base or support and extending to and closing the upper portions of said seats, said yoke being provided at the center with a depending lock casing which is adapted to engage with the said connecting web and hold the yoke thereto.

7. A tire holder of the class described comprising a base or support having spaced concave tire receiving seats with an intervening connecting web, a removable yoke arching the base or support and having its sides extending to and detachably engaging the outer walls of the said seats, and a vertically disposed self-contained lock carried by the yoke at a point between the sides thereof for detachably securing the said yoke to the base or support, said lock being removable with the yoke and having its key hole accessible from the upper side of the yoke.

8. A tire holder of the class described comprising a base or support having spaced concave tire-receiving seats with an intervening connecting web all in one piece, a removable yoke arching the base or support and having its sides extending to and detachably engaging the outer walls of the said seats, said yoke consisting of two bars connected by a coupling, and a lock having its casing mounted within the coupling with its key hole accessible at the top of the coupling, said lock depending from the coupling and carried by the yoke when the latter is removed.

In testimony, that I claim the foregoing as my own, I have hereto affixed my signature in the presence of two witnesses.

FRANKLIN C. MILLER.

Witnesses:
S. S. HORN,
RUSSELL D. WELCH.